(12) United States Patent
de Sene et al.

(10) Patent No.: US 9,565,253 B2
(45) Date of Patent: *Feb. 7, 2017

(54) SCALABLE APPROACH TO MANAGE STORAGE VOLUMES ACROSS HETEROGENOUS CLOUD SYSTEMS

(71) Applicant: International Business Machines Corporation, Armonk, NY (US)

(72) Inventors: Rafael Peria de Sene, Sao Paulo (BR); Tiago Nunes dos Santos, Sao Paulo (BR); Rafael Camarda Silva Folco, Sao Paulo (BR); Breno Henrique Leitao, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/336,687

(22) Filed: Jul. 21, 2014

(65) Prior Publication Data

US 2016/0021185 A1  Jan. 21, 2016

(51) Int. Cl.
*H04L 29/08* (2006.01)
*G06F 17/30* (2006.01)
*H04L 12/911* (2013.01)

(52) U.S. Cl.
CPC ......... *H04L 67/1097* (2013.01); *G06F 17/302* (2013.01); *H04L 47/821* (2013.01)

(58) Field of Classification Search
CPC .................................................. H04L 67/1097
USPC .......................................................... 709/213
See application file for complete search history.

(56) References Cited

U.S. PATENT DOCUMENTS

| 8,347,184 B2 | 1/2013 | Liu |
| 8,407,190 B2 | 3/2013 | Prahlad et al. |
| 2010/0191783 A1 | 7/2010 | Mason et al. |
| 2012/0272025 A1 | 10/2012 | Park et al. |
| 2012/0303736 A1* | 11/2012 | Novotny ............. H04L 67/1097 709/213 |
| 2013/0204849 A1 | 8/2013 | Chacko |
| 2013/0346537 A1* | 12/2013 | Fitzpatrick .......... H04L 67/1097 709/213 |

OTHER PUBLICATIONS

Oracle Cloud File System, Oracle Database, http://www.oracle.com/us/products/database/clous-file-system/overview/index.html; copyright © 2012 Oracle, last printed Jul. 21, 2014.
Enstratius (Dell), Dell Cloud Manager: The Enterprise Cloud Management Solution; http://www.enstratius.com, © 2013 Dell, last printed Jul. 21, 2014.

(Continued)

*Primary Examiner* — David Lazaro
*Assistant Examiner* — Zia Khurshid
(74) *Attorney, Agent, or Firm* — Scully, Scott, Murphy & Presser, P.C.

(57) ABSTRACT

There are provided a system and a computer program product for managing heterogeneous cloud data storage systems. A computing system defines rules that govern a plurality of heterogeneous cloud data storage systems. The computing system receives complete data from a user's computer. The computing system splits the complete data. The computing system stores the split data according to the defined rules into the plurality of heterogeneous cloud data storage systems.

18 Claims, 13 Drawing Sheets

(56) References Cited

OTHER PUBLICATIONS

Media Sharing, Amazon AWS, http://media.amazonwebservices.com/architecturecenter/AWS_ac_ra_mediasharing_09.pdf, last printed Jul. 21, 2014.
Amazon Glacier, Amazon AWS, http://aws.amazon.com/glacier/; AWS|Amazon Glacier—Online Backup Services & Cloud Backup Soluctions, pp. 1-8; last printed Jul. 21, 2014.

* cited by examiner

SCALABLE APPROACH TO MANAGE STORAGE VOLUMES ACROSS HETEROGENOUS CLOUD SYSTEMS

BACKGROUND

This disclosure relates generally to managing heterogeneous cloud storage systems, and more particularly to defining of business rules and applying the defined rules to heterogeneous cloud (i.e., cloud) data storage systems.

BACKGROUND OF THE INVENTION

An adoption of cloud computing storage systems has been increasing faster than ever. As the cloud adoption increases, the interest in exploring this resource properly arises as a necessity that claims special attention, specially for data management. To provide a powerful management capacity, it is necessary to pay close attention to fundamental requirements such as security, availability, integrity and backup. Also, it is important to focus on optimizing the use of cloud computing network bandwidth while keeping latency under control, and achieving lower operational costs at the same time. Naturally, these requirements when brought to corporate environments, are dissolved into several business policies that aims to mitigate any risk that could compromise company's data.

SUMMARY

A system and a computer program product may be provided for managing heterogeneous cloud data storage systems. There are provided a system and a computer program product for managing heterogeneous cloud data storage systems across heterogeneous cloud computing systems.

A computing system defines, applies and enforces rules that govern a plurality of heterogeneous cloud data storage systems. The computing system receives complete data from a user's computer. The computing system splits the complete data. The computing system stores the split data according to the defined rules into the plurality of heterogeneous cloud data storage systems.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

Figure 1:
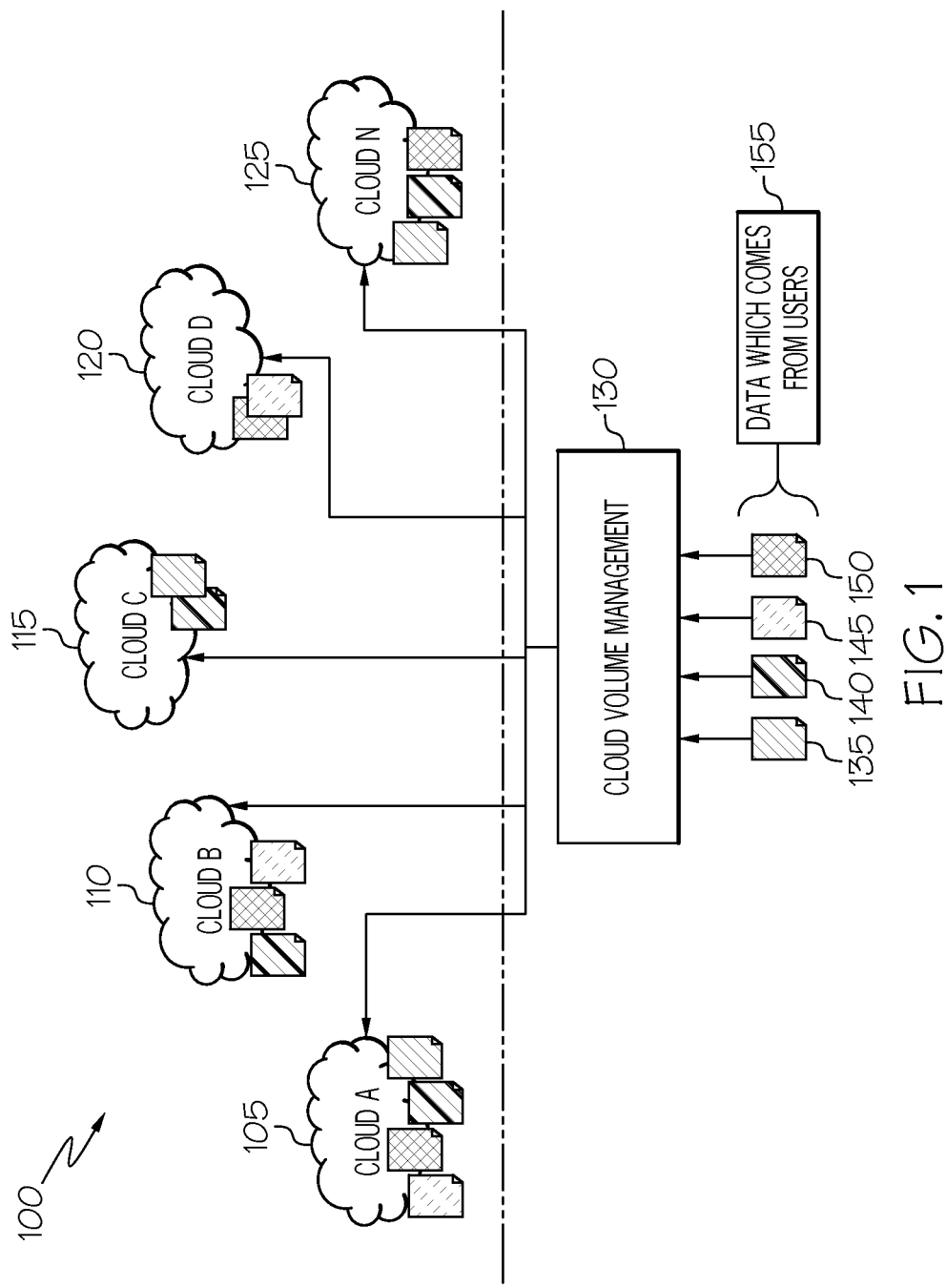
FIG. 1 illustrates an exemplary data storage and management system that include heterogeneous cloud data storage systems in one embodiment.

FIG. 1 illustrates a multi-cloud data storage system 100 (i.e., an apparatus for managing a plurality of remote heterogeneous data storage systems) in one embodiment. The multi-cloud data storage system 100 includes a Cloud Volume Management 130. In one embodiment, the Cloud Volume Management (system) 130 may be a software stack, i.e., the Cloud Volume Management comprises one or more software applications. In another embodiment, the Cloud Volume Management 130 may hardware apparatus designed on a semiconductor chip, e.g., ASIC (Application-Specific Integrated Circuit). The Cloud Volume Management 130 manages different and heterogeneous cloud data storage systems 105-125. These cloud data storage systems 105-125 may each implement a different security level (e.g., use of each different encryption algorithm, etc.), a different network connection latency, a different network connection bandwidth, and a different price to build a corresponding cloud data storage system. The Cloud Volume 130 provides a service, e.g., data storage, etc., to users 155. The Cloud Volume Manager 130 manages the cloud data storage systems 105-125, e.g., by defining business rules in XML documents and applying these business rules when storing data 135-150, received from the users, into the cloud data storage systems.

When a user wants to store data into a cloud data storage system, the user uses an API (Application Programming Interface) (not shown) or a GUI (Graphical User Interface) (not shown) of the Cloud Volume Management. The Cloud Volume Management stores the user's data according to the defined business rules. For example, an exemplary business rule, defined by a system administrator or like user of the multi-cloud data storage system 100, may state that any data shall be stored in a cloud data storage system whose resource usage is the lowest, i.e., available data storage space is the largest among the cloud data storage systems 105-125. In one embodiment, the multi-cloud data storage system 100 may split the user's data and store the split data at one or more different cloud data storage systems whose resource usages are lowest. By running the business rules by the Cloud Volume Management 130, the multi-cloud data storage system 100 splits and/or stores the user's data according to the run business rules.

In another example, the system administrator defines one or more criteria, e.g., in binary code, into the Cloud Volume Management 130, that are used to choose a cloud data storage system among the plurality of heterogeneous cloud data storage systems. Then, by running the binary code, the multi-cloud data storage system stores the user's data in a corresponding cloud data storage system that satisfies the defined criteria or that satisfies most of the defined criteria. The defined criteria include, but are not limited to: a price of storing in a cloud data storage system, etc.

Figure 3:
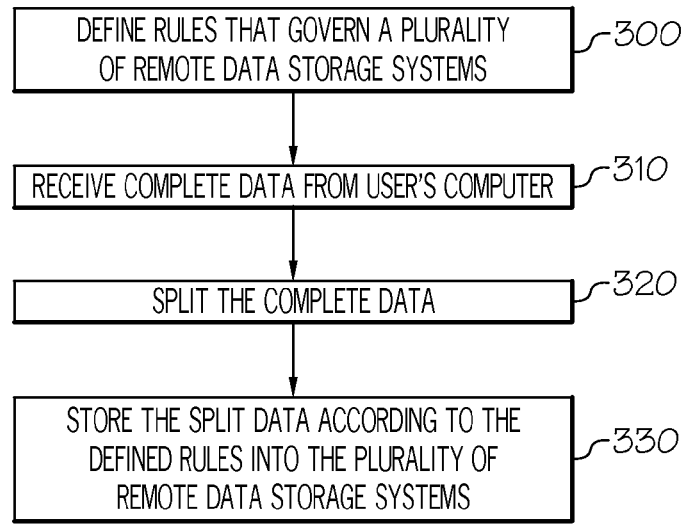
FIG. 3 illustrates a flowchart that describes method steps for managing heterogeneous cloud data storage systems in one embodiment.

In one embodiment, the Cloud Volume Management 130 is a distributed data storage management system that manages a plurality of heterogeneous cloud data storage systems, e.g., by running method steps described in FIG. 3. Each cloud storage system 105, 110, 115, 120 or 125 may be designed and manufactured by a different vendor (or manufacturer). The Cloud Volume Management 130 is configured to split and store data, e.g., file(s), etc., into the cloud data storage systems A (105), B (110) and N (125) and is further configured to use the cloud data storage systems C (115) and D (120) for backup (i.e., copying and archiving, etc.) the data stored in the cloud storage systems A (105), B (110) and N (125).

The multi-cloud data storage system 100 combines heterogeneous cloud data storage systems and decides how data is going to be stored according to pre-defined rules that are described below in detail. The Cloud Volume Management 130 provides storage and data management, e.g., of files, etc., as follows:

(1) Rules are defined in a transparent fashion: rules are programmed or written in a Markup language (e.g., XML (Extensible Markup Language), etc.), a scripting language (e.g., Perl, etc.), or a high-level programming language (e.g., Java, .Net, C/C++, etc.);

(2) The Cloud Volume Management 130 manages data storage space properly and efficiently: data is split and stored into one or more storage devices whose available data storage spaces are the highest or whose price for storage are the lowest in a data storage device market;

(3) The Cloud Volume Management 130 provides a unified user interface to a user(s): through the GUI (not shown) and/or API (not shown) implemented on the Cloud Management System 130, one or more users can store their data and manage (e.g., overwriting, copying, archiving, modifying, etc.) the stored data;

(4) The Cloud Volume Management 130 provides resources management optimization aligned to green strategies: data is split and stored into one or more storage devices whose electric power consumption is the lowest and/or whose data storage availability is largest;

(5) The Cloud Volume Management 130 employs a load balance capability across the heterogeneous data storage systems 105-125: (a) every data storage device installed in each data storage system stores similar or equal amount of data; and (b) the each data storage system processes (e.g., stores, archives, etc.) similar or equal amount of data;

(6) The Cloud Volume Management 130 increases data safety by replicating it automatically: The Cloud Volume Management 130 may employ a known RAID (Redundant Array of Independent Disks) concept and/or employ one or more data encryption technique, e.g., DES (Data Encryption Standard) in order to store the data; and (7) The cloud data storage systems are scalable: (a) the Cloud Volume Management 130 allows an addition of a new data storage system(s) to the multi-cloud data storage system 100; and (b) the Cloud Volume Management 130 allows a removal of one or more exiting cloud data storage system(s) in the multi-cloud data storage system 100.

The multi-cloud data storage system 100 provides further benefits to the user(s) as follows:

(1) the Cloud Volume Management provides a simplified data storage and management service to the user(s) via a one or more GUI (not shown) and/or API (not shown) implemented on the Cloud Volume Management 130;

(2) the Cloud Volume Management 130 and/or the users define one or more rules that describe how data is stored within the cloud data storage system(s) and apply the defined rules when the Cloud Volume Management 130 and/or the user(s) store data, e.g., files, etc.;

(3) the multi-cloud data storage system 100 employs cryptography technique, i.e., the encryption/decryption technique and upon receiving a file, the multi-cloud data storage system 100 divides the received data (i.e., breaks the received data) into separate pieces, e.g., by using a split( ) function in Java® programming language that breaks a character or numerical string to multiple substrings.

Based on these benefits, the Cloud Volume Management 130 improves usability of the cloud data storage system(s), e.g., via the GUI and/or API. By further employing a known data mining technique or a known business intelligence technique, the multi-cloud data storage system 100 increases its performance, its capability, and/or its reliability and decreases the cost needed to maintain the cloud data storage system(s). For example, the cloud data storage systems in the multi-cloud data storage system 100 may store similar or equal amount of data, e.g., by (1) determining (via a known data mining technique) available data storage spaces of all the cloud data storage systems, (2) splitting the received data and (3) storing the split data within the cloud data storage system(s) in the way that each cloud data storage system utilizes similar or equal data storage spaces in order to store the split data. The business intelligence technique includes one or more of: a known data analysis technique, a known data mining technique, a known statistical analysis technique, testing, etc.

In one embodiment, the multi-cloud data storage system 100 encrypts the split data before storing the split data into the cloud data storage system(s). The multi-cloud data storage system 100 may stores the encrypted split data into each different cloud data storage system according to the defined rules.

In one embodiment, the multi-cloud data storage system 100 uses different data storage devices across multiple cloud data storage system(s) which are provided by the different vendors and/or manufactures. Each cloud data storage system includes, but is not limited to: one or more different characteristics—a different manner of accessibility, a different security level, a use of a different encryption algorithm to store the data, a different network to which the each cloud data storage system is connected, etc.

The Cloud Volume Management 130 stores, in its corresponding local memory device, the defined rules, cloud information (e.g., registration information, profile information, current status information), users definitions (i.e., users' information—users' login identification and corresponding passwords), etc. Exemplary cloud profile information is described below. An exemplary defined rule is also described below. The Cloud Volume Management 130 communicates with the one or more users 155, e.g., via the GUI or API. The Cloud Volume Management 130 provides directions to an Input Scheduler 205 and an Output Scheduler 210.

FIG. 3 illustrates method steps, run by the Cloud Volume Management 130, for managing heterogeneous cloud data storage systems. At 300, the Cloud Volume Management 130 defines rules that govern a plurality of the cloud data storage systems. At 310, the Cloud Volume Management 130 receives complete data from a user's computer. Complete data refers to a set of datums which include all the necessary datums, for example, header information, checksum information, network address information, content to be delivered, etc. At 320, the Cloud Volume Management 130 splits the complete data. At 330, the Cloud Volume Management 130 stores the split data according to the defined rules into the plurality of cloud data storage systems. Later, the Cloud Volume Management 130 may retrieve the stored split data from the plurality of cloud data storage systems. In one embodiment, the Cloud Volume Management 130 stores the complete data without splitting the complete data, e.g., in the plurality of cloud data storage systems according the defined rules. In this embodiment, the Cloud Volume Management may retrieve the complete data, which is not split, from the plurality of cloud data storage systems.

The Cloud Volume Management 130 is a distributed data storage management system that manages a plurality of the heterogeneous cloud data storage systems, e.g., by running method steps in FIG. 3. The Cloud Volume Management 130 applies the defined rules, by running binary code that encodes the defined rules, to each of the cloud data storage systems. The one or more users may customize the defined rules, e.g., by using a high-level programming language, etc., depending on each user's need. The Cloud Volume Management 130 may compile the defined rules written by the high-level programming language in order to generate an updated binary code, e.g., by using a compiler.

In one embodiment, the Cloud Volume Management 130 that runs the method steps shown in FIG. 3 may be implemented as a software application. In this embodiment, the software application (i.e., the Cloud Volume Management 130) may be stored in a (cache) memory device or a storage device as binary code that represent method steps shown in FIG. 3. In this embodiment, the Cloud Volume Management 130 may include one or more modules, e.g., functions( ) and/or subroutines, etc., written by a high-level programming language and stored in the memory device (or the storage device) as corresponding binary code. The one or more users may be able to customize the one or more or all modules in the Cloud Volume Management 130 if the one or more users are authorized to access and modify high-level programming language source code of the Cloud Volume Management 130. In another embodiment, the Cloud Volume Management 130 may be implemented as hardware, e.g., ASIC (Application Specific Integrated Circuit) chip by using hardware description language, for example, VHDL (VHSIC Hardware Description Language), etc.

Figure 2:
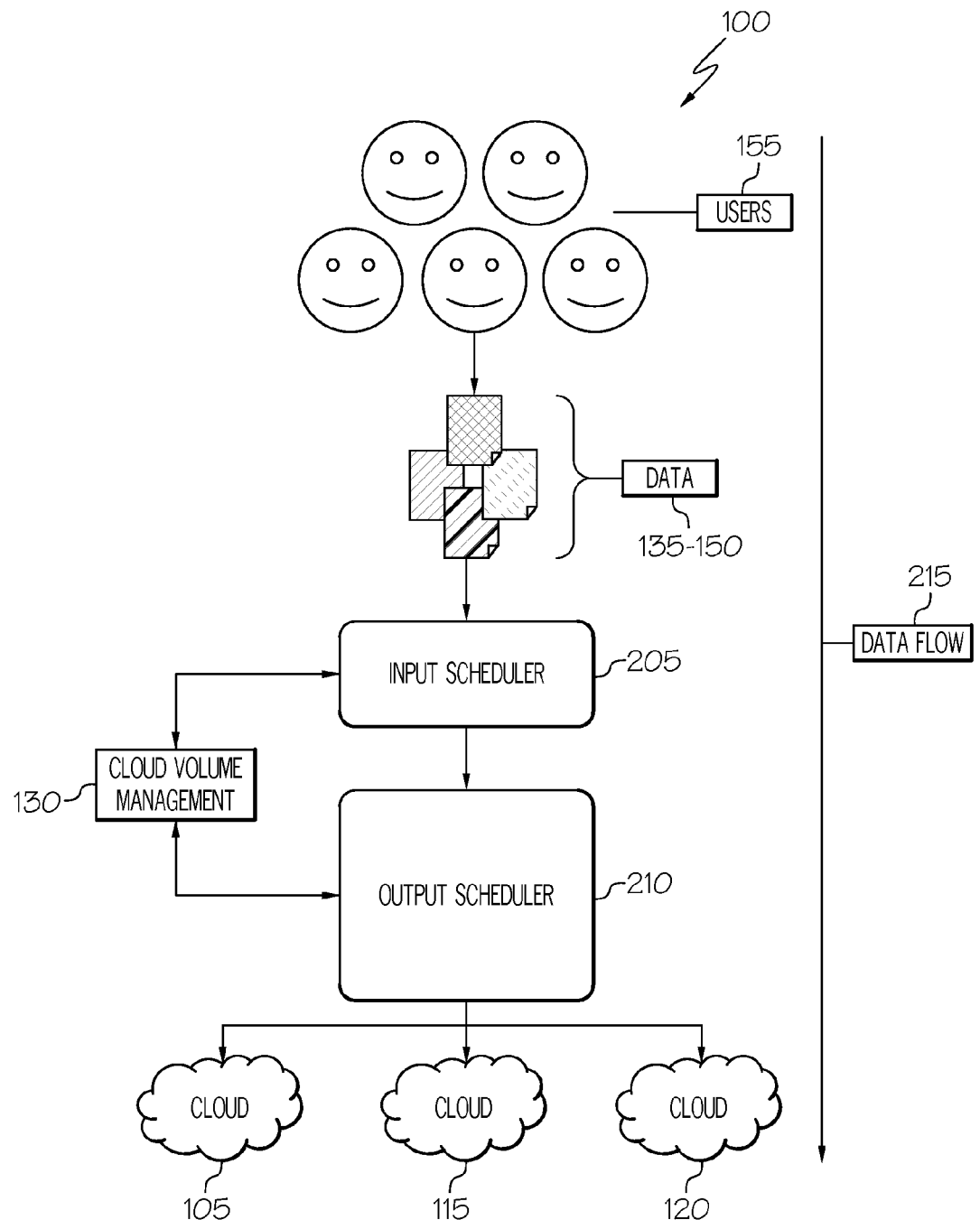
FIG. 2 illustrates an operation of the exemplary data storage and management system in one embodiment.
Figure 15:
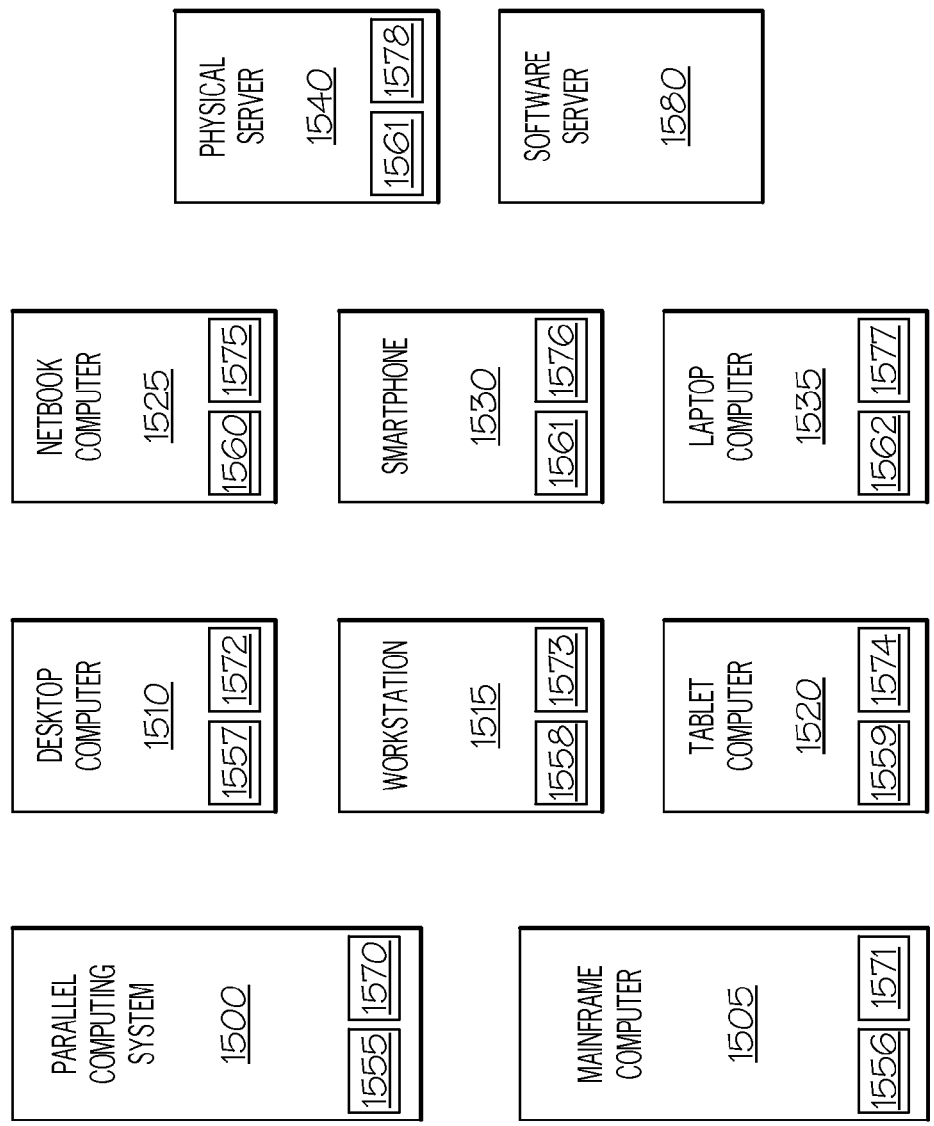
FIG. 15 illustrates exemplary hardware configuration that implement the Cloud Volume Management, the Input Scheduler, and the Output Scheduler in one embodiment.
Figure 16:
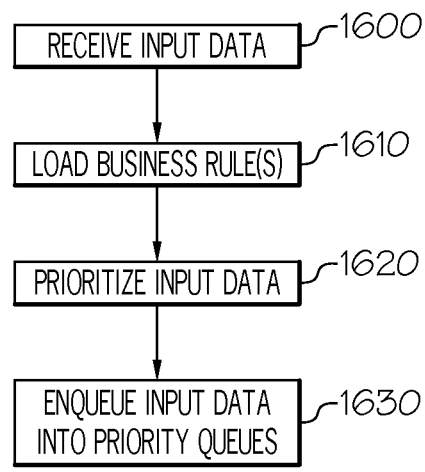
FIG. 16 illustrates a flowchart that describes method steps run by Input Scheduler in one embodiment.

FIG. 2 illustrates an operation of the multi-cloud data storage system 100. FIG. 16 illustrates a flowchart that describes method steps run by the Input Scheduler 205. At 1600, the Input Scheduler 205 receives the data 135-150 from the users' (155) computers, e.g., computers shown in FIG. 15. At 1610, the Input Scheduler 205 loads (i.e., receives and processes, etc.) the defined rules related with priority of the received data from the Cloud Volume Management 130. At 1620-1630, the Input Scheduler 205 prioritizes the received data, e.g., by dispatching the received data into priority queues (e.g., priority queues 400-410 shown FIG. 4) according to the priority of the received data. For example, the defined rule may state that particular files (e.g., .xls files) have a higher priority than other files (e.g., .doc files), e.g., in XML language. There may be provided priority queues each of which represents a corresponding data priority. In this example, if the Input Scheduler 205 receives the particular file(s), the Input Scheduler enqueues the received particular file into a queue in which all the elements (e.g., files or other data, etc.) have the same priority (i.e., the higher priority). In one embodiment, the Output Scheduler 210 includes the priority queue(s).

In one embodiment, the Input Scheduler 205 determines a priority of each data to be stored in a cloud data storage system and/or a queue, e.g., based on the exemplary defined rule or header information of the each data. The Input Scheduler 205 sends the each data to a queue according to the determined priority. In another embodiment, the Input Scheduler 205 splits the received data 135-150 into several piece of data, e.g., by using a split( ) function in Java® programming language that breaks a character or numerical string to multiple substrings. For example, the Input Scheduler 205 splits a single received file into sperate individual files whose names are different. The Input Scheduler 205 sends the split data to a cloud data storage system 105, 115 or 120 according to the defined rule(s). Processing of the multi-cloud data storage system 100 proceeds from receiving the data 135-150 from the user(s) 155 to storing the split received data to a cloud data storage system 105, 115 or 120.

Figure 4:
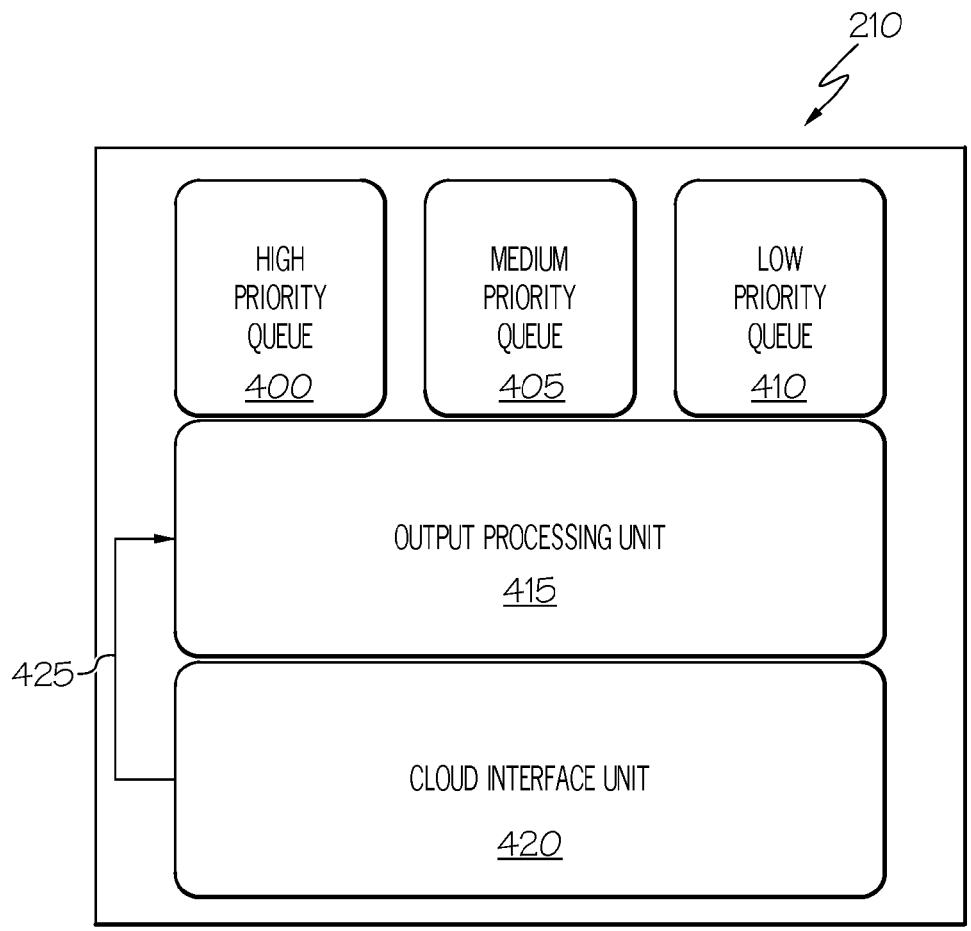
FIG. 4 illustrates a system diagram of an output scheduler in one embodiment.
Figure 17:
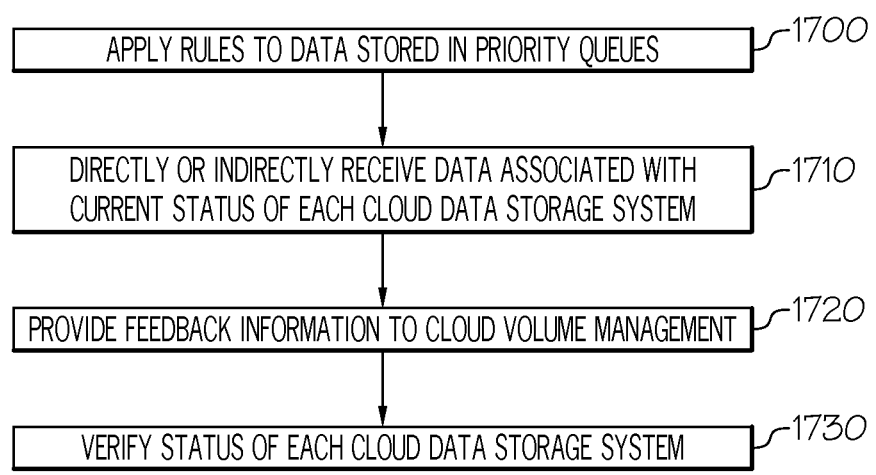
FIG. 17 illustrates a flowchart that describes method steps run by Output Scheduler in one embodiment.

FIG. 17 illustrates a flowchart that describes method steps run by the Output Scheduler 210. FIG. 4 illustrates a system diagram of the Output Scheduler 210. As shown in FIG. 4, the Output Scheduler 210 includes, but is not limited to: the queues 400-410, an Output Processing Unit 415, and a Cloud Interface Unit 420. The Output Scheduler performs tasks as defined in the rule(s). Each different priority queue 400, 405 or 410 represent a data priority, e.g., high priority, medium priority and low priority. The each different priority queue stores data according to a corresponding priority. At 1700, the Output Processing Unit 415 applies the defined rules to the data stored in the each different priority queue. For example, the Output Processing Unit 415 dequeues the data stored in the each different priority queue and applies data encryption on the dequeued data. The Output Processing Unit 415 may also be able to split the received data into several data pieces. In one embodiment, a priority queue stores original received data 135-150. In another embodiment, a priority queue stores the split received data.

The Output Processing Unit 415 encrypts the split data before storing the split data at a priority queue and/or a cloud data storage system. At 1710, the Output Processing Unit 415 also directly or indirectly receives data associated with current status of each cloud data storage system from the each cloud data storage system. For example, the current status of the each cloud data storage system includes, but is not limited to: a network connection/bandwidth of the each cloud data storage system, performance of the each cloud data storage system, etc. Each cloud data storage system may obtain an indication of available network bandwidth associated with the each cloud data storage system, e.g., by running ping command (an instruction that shows how long a data packet take to reach an IP (Internet Protocol) address destination by running "ping the IP address") on a computing system of the each cloud data storage system. At 1720, the Cloud Interface Unit 420 may send one or more data packets representing feedback information (e.g., how to improve the network bandwidth between the Cloud Volume Management 130 and the Output Scheduler 210) to the Cloud Volume Management 130.

The Cloud Interface Unit 420 communicates with the heterogeneous cloud data storage systems 105-120, e.g., by sending the encrypted split data to a cloud data storage system. At 1730, the Cloud Interface Unit 420 verifies the status of each cloud data storage system, e.g., by sending a ping command to an IP address of the each cloud data storage system.

Figure 13:
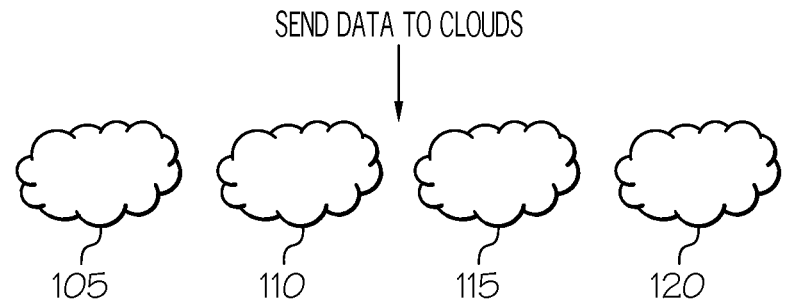
FIG. 13 illustrates a variety of heterogeneous cloud data storage systems in one embodiment.
Figure 14:
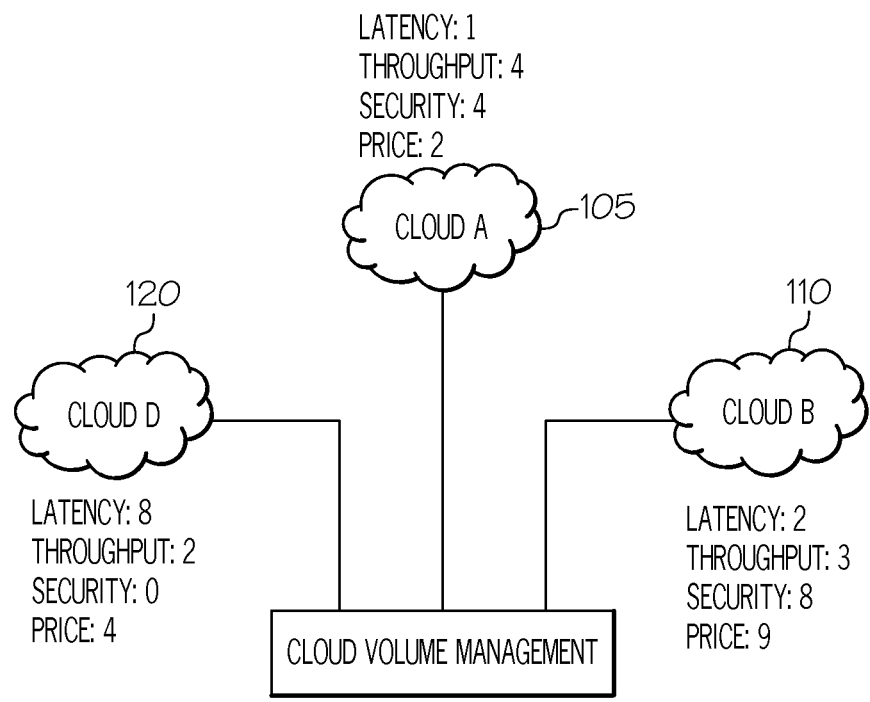
FIG. 14 illustrates exemplary different configuration of heterogeneous cloud data storage systems in one embodiment.

FIG. 13 illustrates different types of cloud data storage systems 105-120. A different cloud data storage system has different characteristics and features that may need to be considered when determining where a given data is to be stored. Each organization has different policies (i.e., the defined rules) and therefore different needs. So, the defined rules describes what is important or not for each kind of data.

The defined rules describe one or more of: (1) an identification information of the each cloud data storage system, e.g., identification information (i) as shown in the following business rule example 1; and (2) data types that can be stored in the each cloud data storage system, e.g., a rule description (ii) as shown in the following business rule example 1. The defined rules may specify that each cloud data storage system stores a different type of data. Corresponding pseudo code of the defined rule(s) is described as follows:

Exemplary Rule 1

```
<storage>
    id=mybusiness.storage.id        // (i)
    dataType=.doc, .xls             // (ii)
    ...
</storage>
```

Exemplary Rule 2

```
<storage>
    id=mybusiness.storage.id        // (iii)
    <dataType>
        type=.doc                   // (iv)
        <priority>
            priority=low            // (v)
        </priority>
    </dataType>
    <dataType>
        type=.xls                   // (vi)
        <priority>
            priority=high           // (vii)
        </priority>
    </dataType>
</storage>
```

The business rule example 2 describes that a cloud data storage system identified at (iii) stores one or more of: .doc file (iv) having a low priority (v), .xls file (vi) having a high priority (vii), etc.

A business rule can define cloud data storage information that includes, but is not limited to: 1. Performance of one or more cloud data storage systems; 2. Redundancy of the one or more cloud data storage systems; 3. Data type that can be stored the one or more cloud data storage system; and 4. Security, for example, an encryption/decryption algorithm (s) used in the one more cloud storage systems. The Cloud Volume Management 130 stores, in one or more local memory device(s), etc., a set of business rule defined by the user(s) that define what each cloud data storage system can store. A cloud data storage system may be more sensitive to network communication latency and may store frequently accessed files. Another cloud data storage system may be more secure than other cloud data storage systems, e.g., by employing an encryption/decryption algorithm that uses a longer key, e.g., 256-bits key and a longer block size, e.g., 128-bits block size.

The users and/or the Cloud Volume Management 130 may define cloud (data storage) information, e.g., by using a programming language, a Markup language, a scripting language, etc. An exemplary cloud information is as follows:

```
<cloudDefinition>
    <cloud>                                     // (a0)
        id=mycloud.storage1.id                  // (a1)
        name=MyCloud1                           // (a2)
        priority=high                           // (a3)
        address=123.123.123.1                   // (a4)
        profile=profile.highpriority.id         // (a5)
        business=mybusiness.storage.id          // (a6)
    </cloud>                                    // (a7)
    <cloud>                                     // (b0)
        id=mycloud.storage2.id
        name=MyCloud2
        priority=low
        address=123.123.123.2
        profile=profile.highpriority.id
        business=mybusiness.storage.id
    </cloud>                                    // (b1)
</cloudDefinition>
```

This exemplary information defines characteristics of two different cloud data storage systems: a first cloud data storage system defined at (a0)-(a7) and a second cloud data storage system defined at (b0)-(b7). The first cloud data storage system information defines one or more characteristics of the first cloud data storage system: (a1) an identification of the first cloud data storage system; (a2) a name of the first cloud data storage system; (a3) a priority of data stored in the first cloud data storage system; (a4) an IP address of the first cloud data storage system; (a5) profile data which is represented by one or more of: the priority (a3) and the identification (a1); and (a6) corresponding business information that is represented by one or more of: the identification (a1) and a name of a user's business. The second cloud data storage system is similarly defined at (b0)-(b7).

An exemplary cloud profile data (a5) may be defined by the user(s) and/or the Cloud Volume Management 130 as follows between lines (c0) and (c6):

```
<profile>                                   // (c0)
    id=profile.highpriority.id              // (c1)
    name=HighPriority                       // (c2)
    <security>
        level=high                          // (c3)
        cryptography=yes                    // (c4)
        <cryptoType>
            type=myCryptographyType         // (c5)
        </cryptoType>
    </security>
    ...
</profile>                                  // (c6)
```

The user(s) and/or the Cloud Volume Management 130 may define this exemplary profile data, e.g., by using a programming language, a Markup language, a scripting language, etc. This exemplary profile data describes one or more of: (c1) the identification of the profile (which, in this example, is the same to the (a5) of the exemplary cloud information; this profile information may be a source of the profile data of cloud information); (c2) a priority of data associated with this cloud profile; (c3) a security level, e.g., high (for example, data is transferred via a secure network connection and all or some of the data may be encrypted before data storage); (c4) an indication of whether an encryption/decryption algorithm is used under this cloud profile data; and (c5) a name of an encryption/decryption algorithm used under this cloud profile data, etc.

FIG. 13 represents different characteristics (different cloud information) between different cloud data storage systems 105, 110 and 120. For example, a cloud data storage system A (105) has characteristics, which may be defined in corresponding cloud profile data and/or corresponding cloud information. Network communication latency of the cloud data storage system A (105) may be, for example, one second. Throughput of the cloud data storage system A (105) may be, for example, that processing of four complete data by following the method steps in FIG. 3 may take one second. Security level of the cloud data storage system A (105) may be, for example, four (i.e., the highest security level). Price of the cloud data storage system A (105) may be, for example, two US million dollars.

In one embodiment, the user creates one or more different business rules, e.g., by using a programming language, a markup language, and/or a scripting language. The cloud management system 130 applies a different rule to each corresponding cloud data storage system. The cloud management system 130 may exchange one or more applied rules between two or more cloud data storage systems upon receiving one or more users' requests. The cloud management system 130 applies the exchanged rule(s) to corresponding cloud data storage systems whose previous rule(s) are replaced with the exchanged rule(s).

In one embodiment, the API of the Cloud Volume Management 130 includes software libraries, e.g., Java® classes, which provide basic functionalities for creating software and/or hardware application(s) (not shown) that the user(s) can use to access the Cloud Volume Management 130 and/or the cloud data storage systems. Through the created software and/or hardware applications, the user(s) may enter and/or program commands to store and retrieve, from and to the cloud data storage systems, any amount of data at anytime from anywhere. The created software and/or hardware applications may include, but are not limited to: database management system(s) used to manage and retrieve data stored in the cloud data storage systems, file systems used to manage and retrieve files stored in the cloud data storage systems, load balancer(s) used to balance amount of data stored across the cloud data storage systems, data storage device(s) used to store data in the cloud data storage systems, etc.

The following describes a scheduling algorithm of the Cloud Volume Management 130. The Cloud Volume Management 130 starts to operate, e.g., by pressing a "start" button or icon (not shown)) via the GUI of the Cloud Volume Management 130. The Cloud Volume Management 130 loads one or more information, but not limited to: the cloud profile data of the cloud data storage systems, the cloud data storage information of the cloud data storage systems, security policies of the cloud data storage systems and the defined rules of the cloud data storage systems. The Input Scheduler 205 performs a first part of the scheduling algorithm (i.e., the loading of the one or more information), e.g., by running one or more exemplary commands as follows:

```
CVMManager.loadClouds( );                    // d1
CVMManager.loadCloudStorageRules( );         // d2
CVMManager.loadCloudSecurityRules( );        // d3
CVMManager.loadCloudProfilesDescriptions( ); // d4
```

An exemplary command d1 may let the Cloud Volume Management 130 activate and/or access one or more cloud data storage system(s). An exemplary command d2 may let the Cloud Volume Management 130 activate one or more defined rule(s) associated with one or more cloud data storage system(s), e.g., by running the one or more defined rule(s). An exemplary command d3 may let the Cloud Volume Management 130 activate security rule(s), which may be included in the defined rule(s), e.g., by running binary code corresponding to the security rule(s). An exemplary command d4 may let the Cloud Volume Management 130 activate and/or access one or more cloud profile data, e.g., by running the one or more cloud profile data.

Upon loading all the information of the cloud data storage systems into the Cloud Volume Management 130, the Input Scheduler 205 starts to receive input data, e.g., files, etc., from the user(s)' computers. The Input Scheduler ensures that incoming data include associated data priority, e.g., in a data field(s) incoming data. Based on the associated data priority, the Input Scheduler 205 assigns an amount of processing times and/or resources to corresponding data. For example, the Input Scheduler 205 assigns more processing times and/or resources to data with a high priority. The Input Scheduler 205 assigns less processing time and/or resources to data with a low priority. Prioritization of each data may ensure that high priority data are processed as soon as possible. The following describes exemplary pseudo code run by the Input Scheduler 205 to determine a data priority of each data (g2) and further to send the each data to the Output Scheduler 210 (g3). The running of this exemplary pseudo code (g1-g3) may continue until the Input Scheduler 205 does not receive any input data (g1).

```
While (hasInputData) {              // g1
    checkDataPriority(InputData);   // g2
    sendToOutputScheduler(InputData); // g3
}
```

Upon receiving the input data from the Input Scheduler 205, the Output Scheduler 210 applies the security rules, e.g., an encryption and/or decryption, etc., on the received input data. In one embodiment, an applied security rule(s) is associated with a data priority of each received input data. The sort of security rule(s), e.g., the sort of encryption algorithm(s), etc., which to be applied may be defined by the security rule(s) which may be specific for each type of data. For example, the Output Scheduler 210 may apply an encryption algorithm with more bits in a key and more number of blocks, e.g., AES (Advanced Encryption Standard) algorithm which runs with 256-bit keys and 64 blocks each of which is 128 bit.

In one embodiment, the Output Scheduler 210 includes one or more software and/or hardware modules which may communicate with each other as each node communicates in a tree data structure. For example, a module at leaf node may communicate only with the parent node(s) of that module. A module at a root node may control modules at other nodes (including all the modules other than the module located at the root node), e.g., by sending commands to modules located at intermediary nodes and at leaf nodes and receiving acknowledgement and/or feedback data from modules located intermediary nodes and/or leaf nodes. Each module may handle one or more data types with a specific priority, e.g., a high priority. For example, a module that is assigned to high priority data type may run AES or DES or both on data to be stored at corresponding cloud data storage systems. When the Input Scheduler 205 sends the input data, the Input Scheduler 205 sends directly or indirectly to a module in the Output Scheduler 210 which is assigned to process data types with one or specific data priorities. That module may process only data having those data types and/or having those specific data priorities. When each data arrives at the Output Scheduler 210, the Output Scheduler identifies data priority of the each data and runs specific module(s) that are assigned to the identified data priority. Those specific module(s) have corresponding security rule(s). Those specific module(s) apply those security rule(s), e.g., particular encryption algorithm(s), etc., over the data sent to those module(s). The security rules include, but are not limited to: cryptography (i.e., data encryption/decryption), splitting data to store each split data to multiple cloud data storage systems, running of data backup (e.g., implementing of RAID, etc.) and running of data replication (e.g., implementing of RAID, etc.) and implementing of data redundancy (e.g., implementing of RAID, etc.), etc. The following pseudo code (h1-h3) describes that the Output Scheduler 210 applies (different) security rules to each input data.

```
While (InputData) {          // h1
    applySecurityLayer(InputData);  // h2
    ...                      // h3
```

The Output Scheduler 210 sends the processed data (e.g., encrypted split data, etc.) to one or more destinations, i.e., one or more cloud data storage systems. Based on the defined rule(s), the Output Scheduler 210 determines where to send the current data. For example, by running an exemplary rule 2, the Cloud Volume Management 130 configures a cloud data storage system named "mybusiness.storage.id" to store a low priority word document(s) and further to store a high priority spreadsheet(s). By accessing the Cloud Volume Management 130 and/or accessing a defined rule(s), the Output Scheduler 210 may be able to determine a destination of each processed data. Alternatively, each processed data may include a data field, e.g., header field, etc., which indicates a destination of each processed data. By inspecting and/or examining the header field of the each processed data, the Output Scheduler 210 determines one or more final or intermediary destination of the each processed data.

Besides splitting and encrypting the input data and sending the encrypted split data to corresponding cloud data storage systems, the Output Scheduler 210 constantly verifies the status of each cloud data storage system and provides corresponding feedback data to the Cloud Volume Management 130. In one embodiment, the cloud interface unit 420 in the Output Scheduler 210 evaluates current status of each cloud data storage system and sends data that represent the evaluated current status of the each cloud data storage system to the output processing unit 415 in the Output Scheduler 210. The output processing unit 415 sends the data representing the evaluated current status of the each cloud data storage system to the Cloud Volume Management 130. The Output Scheduler 130 may dynamically re-assign and/or update the defined rules in order to optimize (e.g., maximize, etc.) usages of the cloud data storage systems. In order to maximize the usages of the cloud data storage systems, the Output Scheduler 210 leverages a shortest path algorithm, e.g. Dijkstra's, Bellman-Ford, A*, Best-first, etc. The leveraging of these shortest path algorithm can determine a shortest path to a cloud data storage system in which corresponding data is to be stored. These shortest distance algorithms may be modified to run a graph whose nodes represent the Cloud Volume Management 130 and the cloud data storage systems and whose edges represent network communication connection between two or more nodes. An edge in the graph may have two or more weights: (1) a weight representing a network communication latency between two or more nodes; and (2) a weight representing a network communication bandwidth between two or more nodes. By monitoring the network communication latency and the network communication bandwidth associated with each cloud data storage system, the Cloud Volume Management 130 provides a real-time adaptation capability (e.g., updating the defined rules in real-time based on the feedback data, etc.) to the user(s) and/or the cloud data storage systems. An example of the updating the defined rules include, but is not limited to: changing a data type that can be stored in a corresponding cloud data storage system. The following describes pseudo code (j1-j3) that may be run by the Output Scheduler 210. At j1, the Output Scheduler 210 receives the input data whose header information indicates a corresponding destination cloud data storage system. The Output Scheduler 210 further evaluates whether the destination cloud data storage system and/or other cloud data storage system currently operate, e.g., by using sc.exe file in Windows® operating system which can be used for evaluate a current status of each cloud data storage system and/or by using Remote Desktop Connection application which enables the Output Scheduler to connect to each cloud data storage system. At j2, upon determining that the destination cloud data storage system currently operates, the Output Scheduler 210 sends the processed data to the destination cloud data storage system. At j3, the Output Scheduler 210 continuously or periodically updates status of the destination cloud data storage systems, e.g., by using the sc.exe file or the Remote Desktop Connection application.

```
    ...
    checkCloudViability(destinationCloud);   // j1
    sendData(InputData);                     // j2
    updateCloudStatus(destinationCloud);     // j3
}
```

FIGS. 5-11 illustrate exemplary method steps run by the multi-cloud data storage system 100. Assume that there exists at least three different cloud data storage systems, A, B and C. Users produces a first-type data (e.g., .doc® file), a second-type data (e.g., .xls file) and a third-type data (e.g., .ppt® file). Assume that the first-type data has a greater priority than the second-type data. Assume that the second-type data has a greater priority than the third-type data. The cloud data storage system A is designed for a backup data storage of cloud data storage systems B and C. Assume that cloud data storage systems B and C receive split data from the Output Scheduler 210. Assume that all the cloud data storage systems use the same cryptography (i.e., encryption/decryption) algorithm.

Figure 5:
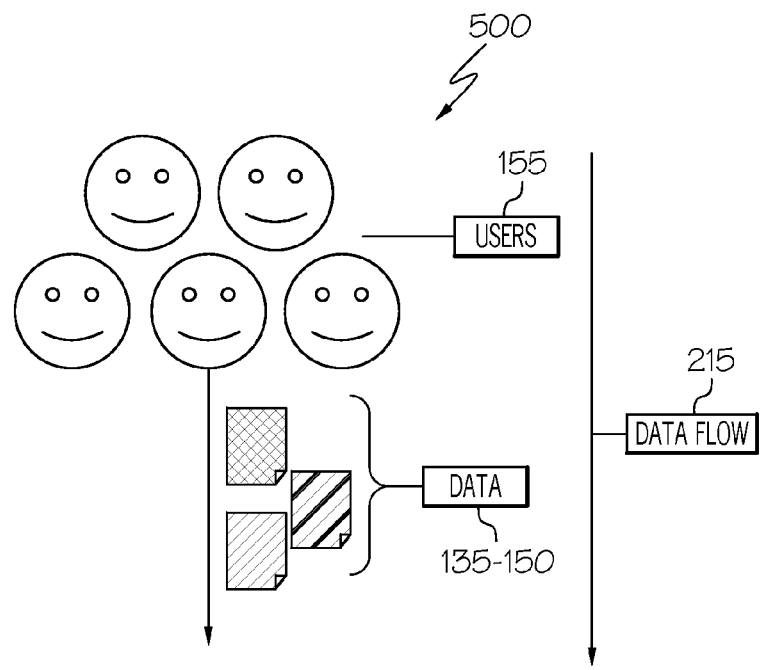
FIGS. 5-11 illustrate method steps for managing heterogeneous cloud data storage systems across heterogeneous cloud data storage systems in one exemplary embodiment.
Figure 6:
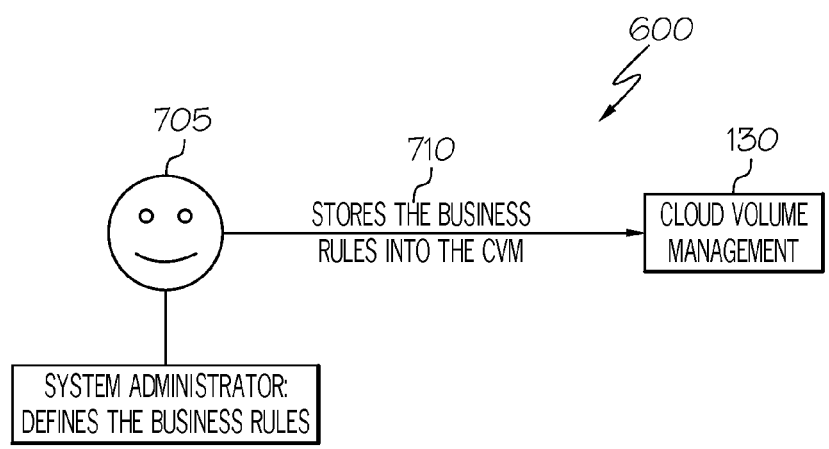

FIG. 5 illustrates the first exemplary method step: the users produces the data 135-155, e.g., the first-type data, the second-type data and the third-type data. Upon the users attempting to save the data, e.g., by pressing a "start" button or icon of the GUI of the multi-cloud cloud data storage system 100, the multi-cloud data storage system 100 starts to operate and the data 135-155 flow to the multi-cloud data storage system 100. FIG. 6 illustrates the second exemplary method step as follows. A user, e.g., a system administrator, 705 defines rules (e.g., exemplary rules 1 and 2 described above, etc.) written in a programming language, binary code, a markup language, or a scripting language, and runs the defined rules over the multi-cloud data storage system 100. The multi-cloud data storage system 100 applies the defined rules to the data 135-155 when processing and storing the data 135-155. In one embodiment, all or some of the defined rules are stored 710 at one or more local memory device (and/or local storage device) of the Cloud Volume Management 130.

Figure 7:
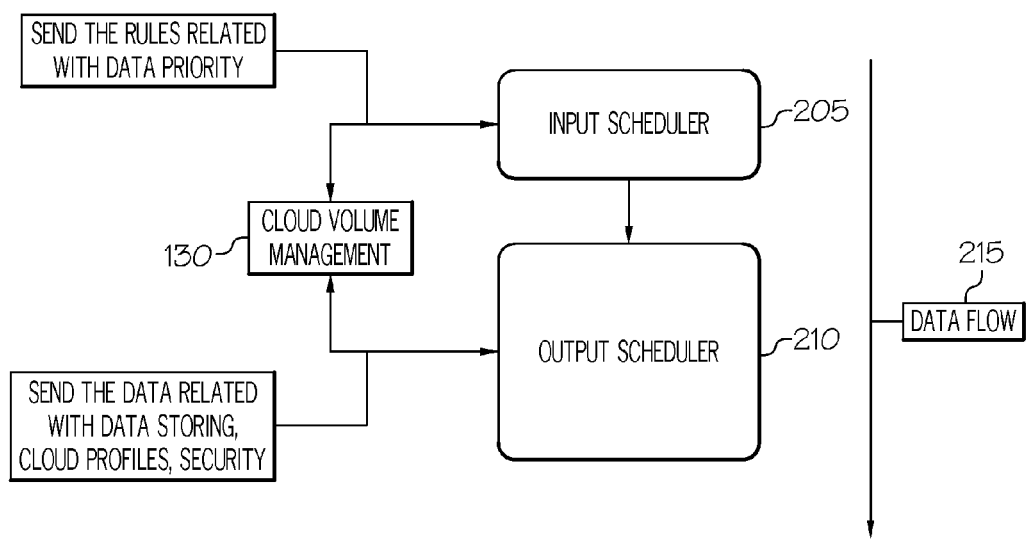

FIG. 7 illustrates the third exemplary method step: the Cloud Volume Management 130 sends the stored rules (e.g., exemplary rules 1 and 2, etc.), which may describe data priority information of each data type, to the Input Scheduler 205. In one embodiment, the Input Scheduler 205 may overwrite or modify the defined rules upon receiving newly defined rule(s) and sends the newly defined, overwritten and/or modified rules to the Cloud Volume Management 130. The Cloud Volume Management 130 sends the defined rules, the cloud profile data including one or more security policies (e.g., whether to use a cryptography algorithm, etc.) and/or the cloud data storage information to the Output Scheduler 210. In one embodiment, the Output Scheduler 210 may update the defined rules, the cloud profile data and the cloud data storage information, e.g., based on the feedback data received from the Output Scheduler 210, and sends the updated rules to the Input Scheduler 205. The data 135-155 flows from the Input Scheduler 205 to the Output Scheduler 210 vice versa.

Figure 8:
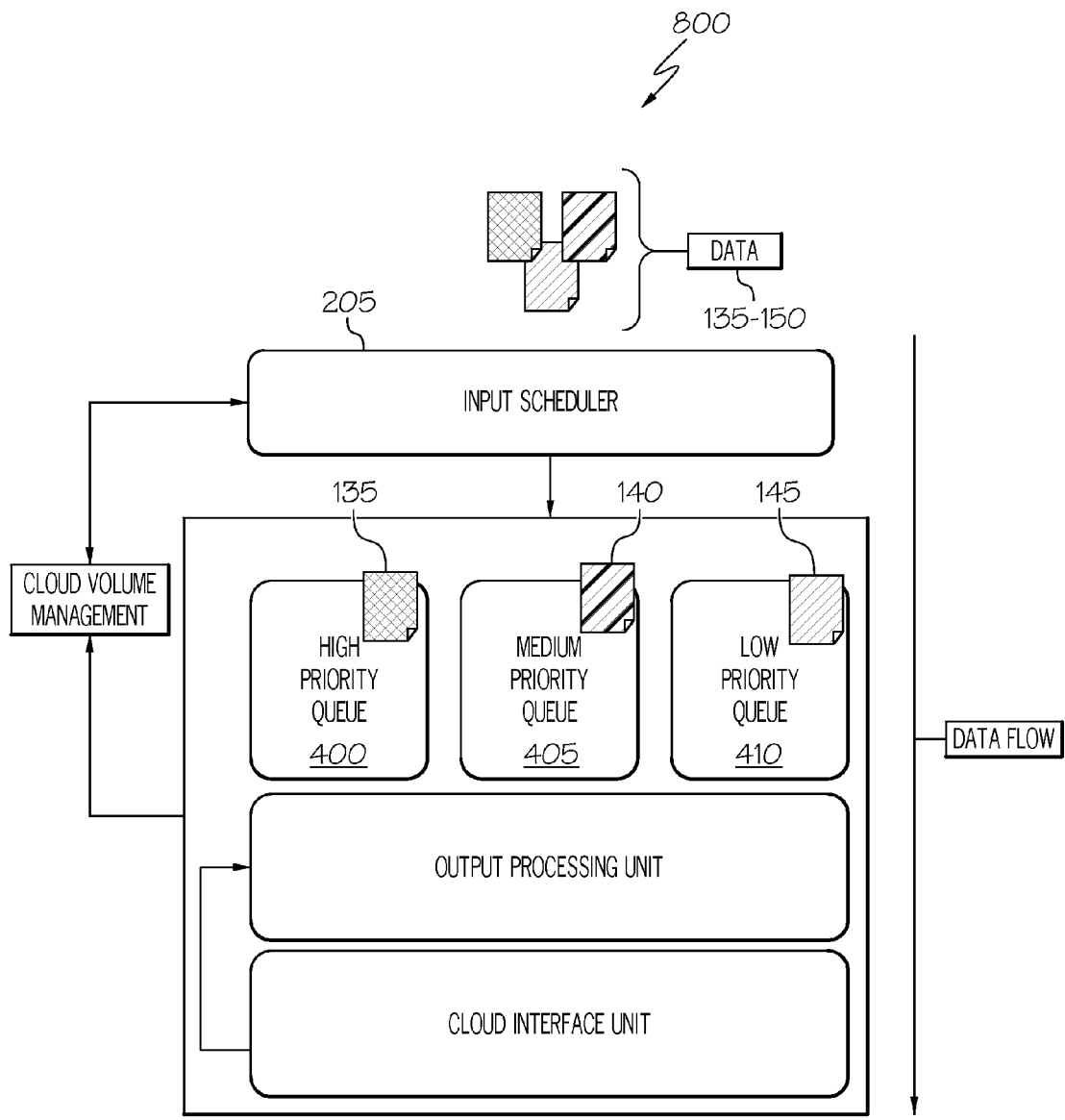

FIG. 8 illustrate the fourth exemplary method step as follows. When the input date 135-150 arrives at the Input Scheduler 205. The Input Scheduler 205 sends each input data to one or more corresponding priority queue(s). For example, the Input Scheduler 205 sends the second-type data whose priority is the highest to the high priority queue 400. The Input Scheduler 205 sends the first-type data whose priority is a medium priority to the medium priority queue 405. The Input Scheduler 205 sends the third-type data whose priority is the lowest to the low priority queue 410. In one embodiment, the highest priority queue 400 takes longer times to receive, store and send out a corresponding data than the medium priority queue 405 or the lowest priority queue 410. In another embodiment, the highest priority queue 400 takes less times to receive, store and send out a corresponding data than the medium priority queue 405 or the lowest priority queue 410.

Figure 9:
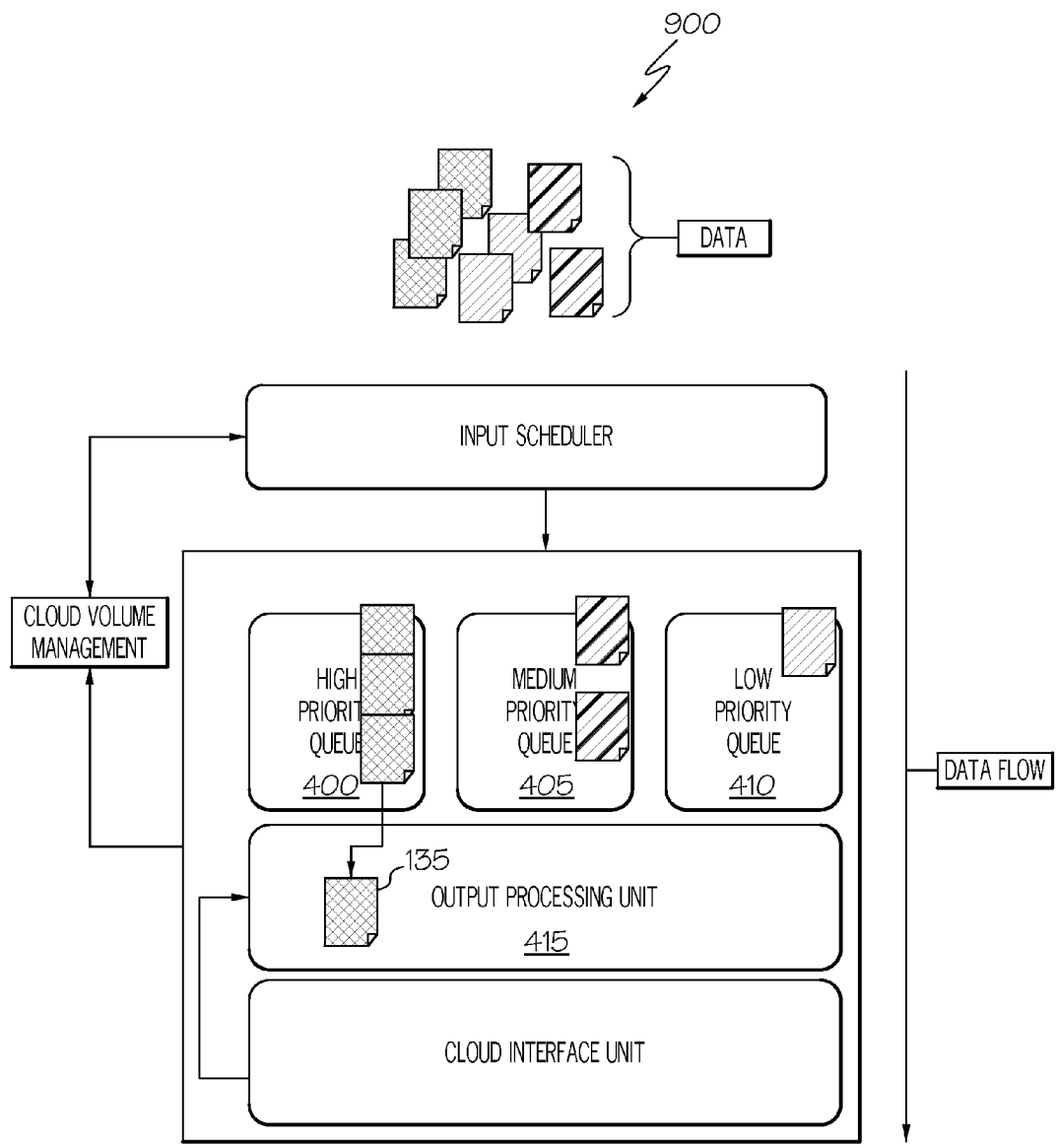
Figure 10:
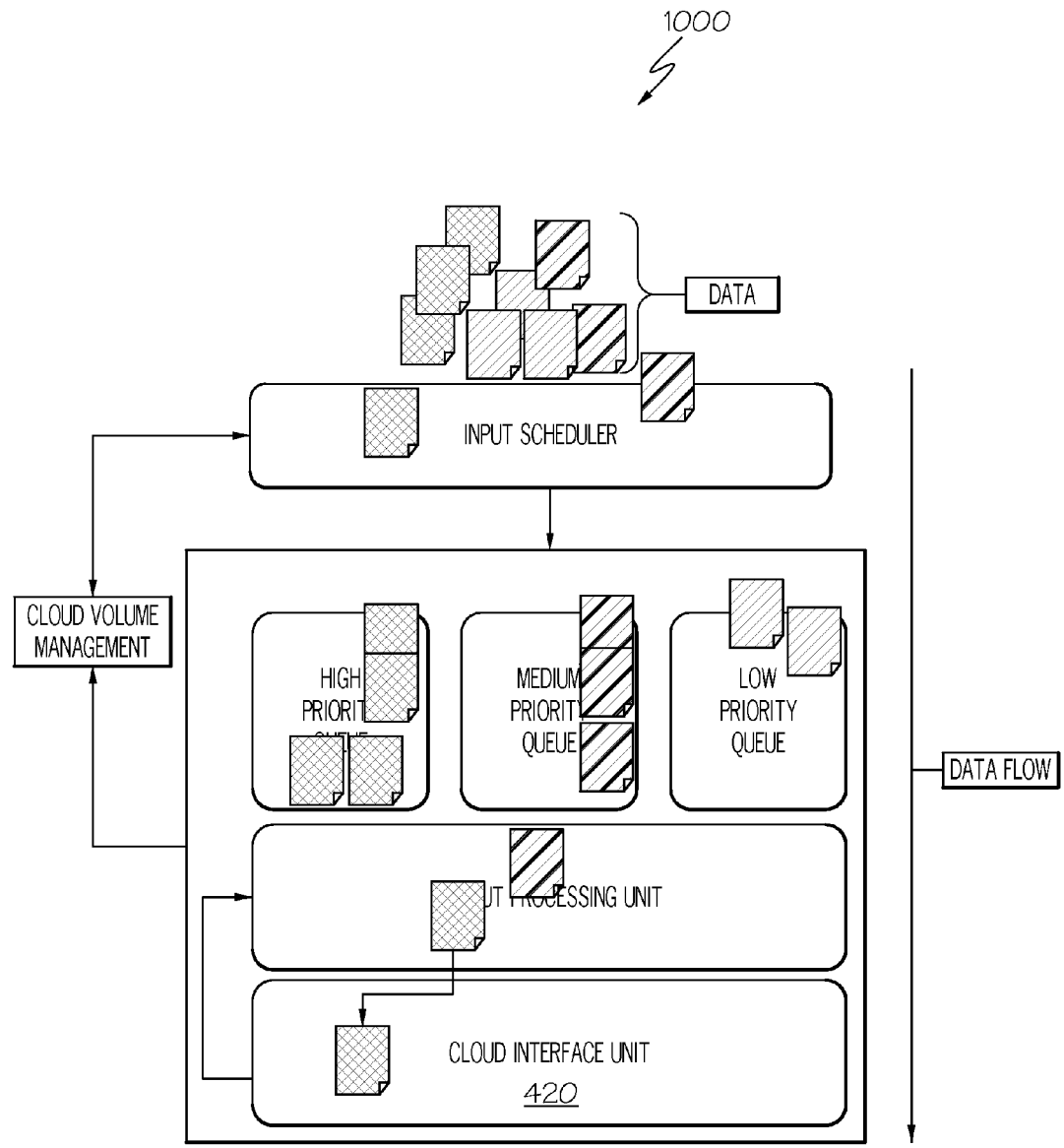
Figure 11:
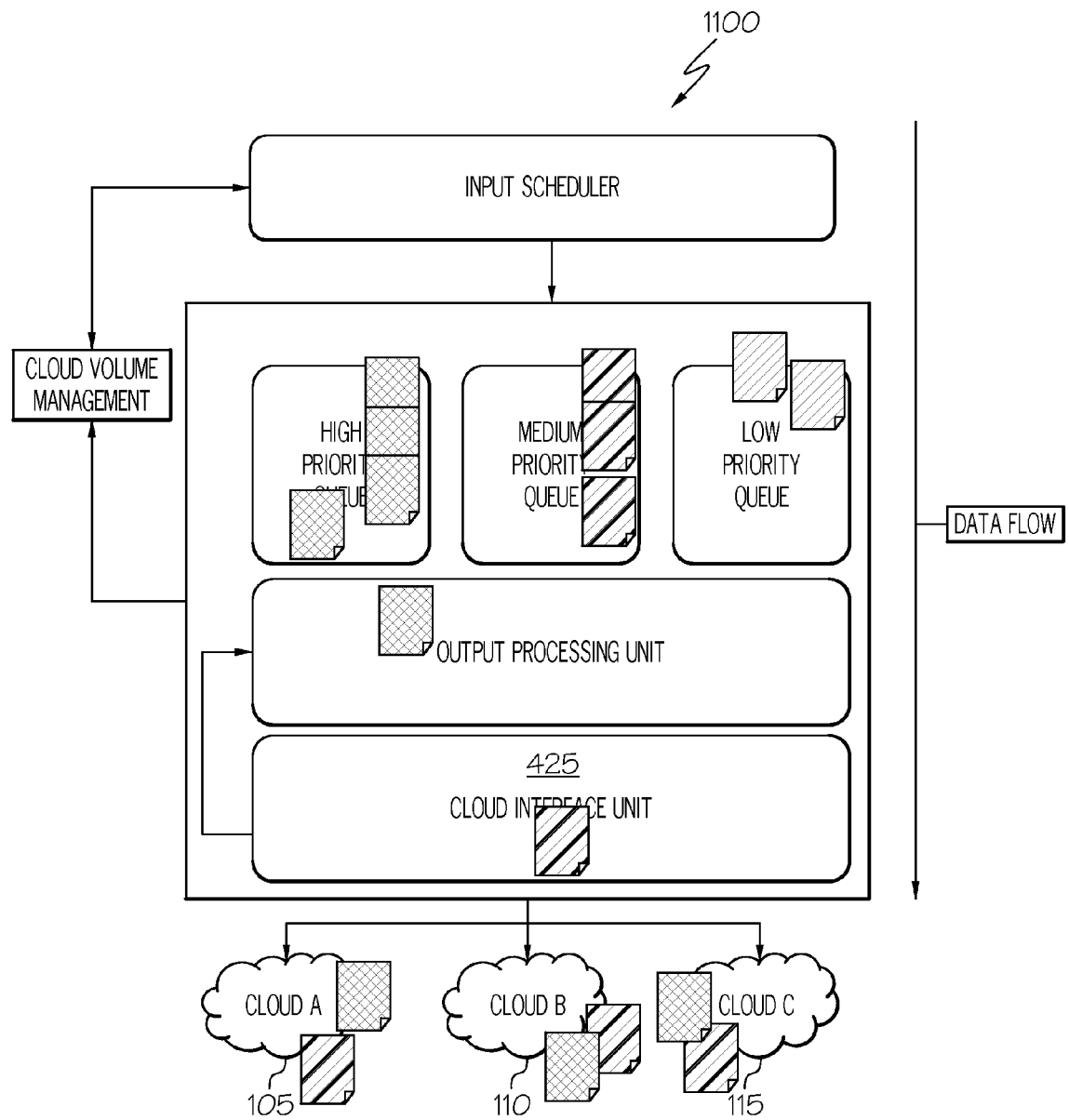
Figure 12:
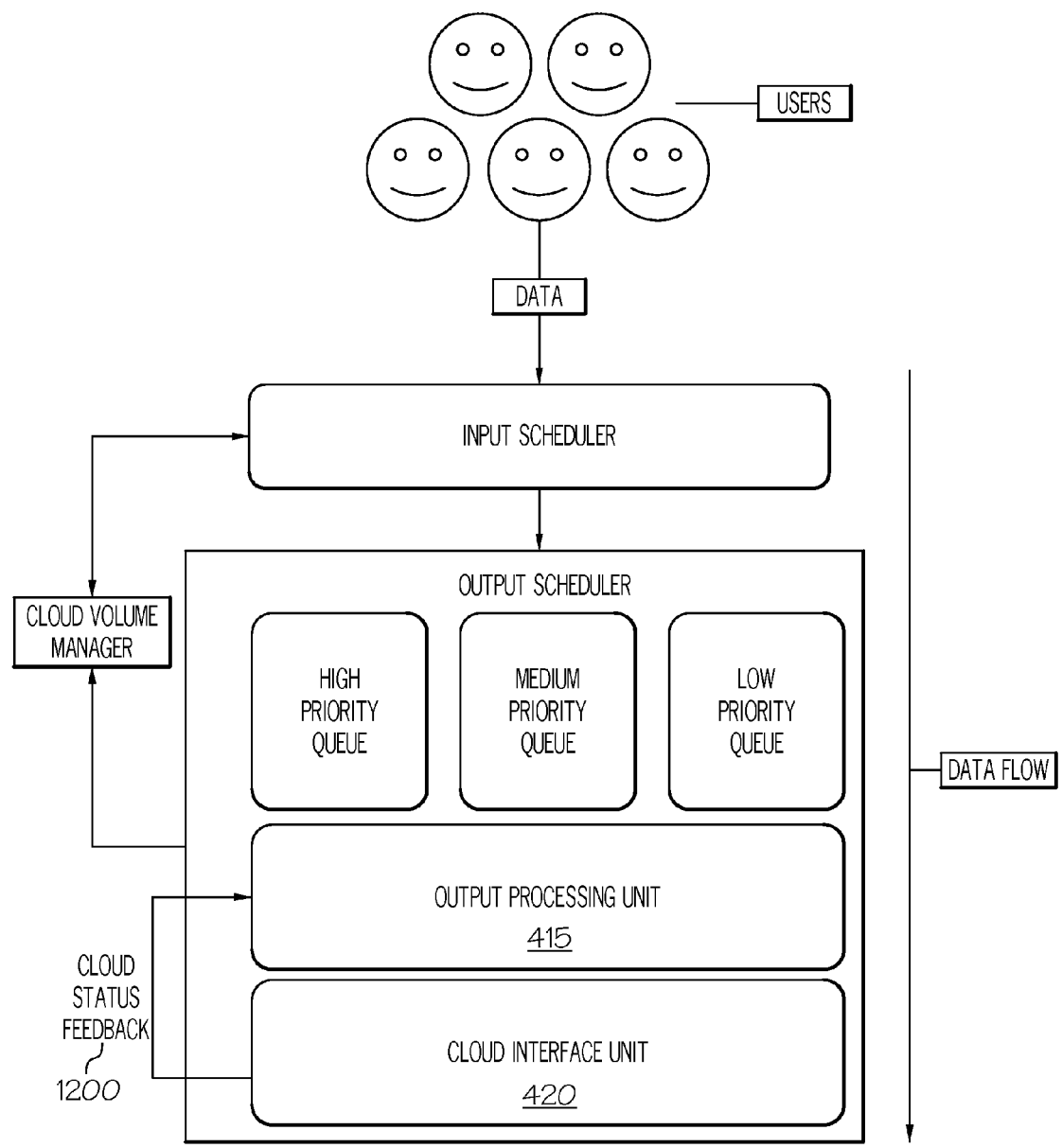
FIG. 12 illustrates an operation of the output scheduler in one embodiment.

FIGS. 9-11 illustrate the fifth, the sixth and the seventh exemplary method steps as follows. The Output Processing Unit 415 retrieves the input data (e.g., the second-type data 135, etc.) from the priority queues 400-410. The Output Processing Unit 415 applies the security policies (e.g., data encryption and/or data decryption, etc.) on the retrieved input data. Once the Output Processing Unit 415 completes processing of (e.g., the applying the security policies on, etc.) the retrieved input data, the Cloud Interface Unit 420 stores the processed data in corresponding one or more cloud data storage systems 105, 110 and/or 115 according to the defined rules.

In one embodiment, there is provided a virtual machine (e.g., Java® virtual machine, etc.) (not shown) in the multi-cloud data storage system 100. In a further embodiment, the virtual machine stores all data to be used by the virtual machine in the same cloud data storage system which is a host server system of the virtual machine. In this embodiment, the virtual machine cannot split the input data and cannot store the input data across multiple cloud data storage systems. The virtual machine may store the input data only in a single cloud storage system which hosts the virtual machine.

In a further embodiment, there are provided a plurality of virtual machines in the multi-cloud data storage system 100. In this embodiment, a virtual machine cannot access data stored only in a corresponding cloud data storage system. The virtual machine cannot access data stored in another cloud data storage system. In this embodiment, data stored in each cloud storage system is not related to each other, e.g., not split data.

In another embodiment, a virtual machine in the multi-cloud data storage system 100 may store data, e.g., files, etc., in one or more different cloud data storage systems according to the defined rules. The virtual machine may apply the defined rules differently to each data type, depending on the data priority of the each data type, e.g., by using if and else clause or a hardware multiplexer, etc. The multi-cloud data storage system 100 increase data safety, e.g., by using data replication and/or data redundancy. For example, a structure of data storage devices used in the cloud data storage systems may be similar to RAID. The multi-cloud data storage system 100 may split data, e.g., a file, etc., and stores split data across multiple different cloud data storage systems. The virtual machine and/or the Cloud Volume Management 130 may have a transparent user interface, e.g., a graphical user interface which combines and integrates all the graphical user interfaces of all the different cloud data storage systems, which enables user(s) to communicate a plurality of different distributed cloud data storage systems.

In one embodiment, the multi-cloud data storage system 100 may allow a single data to be shared across different cloud data storage systems, e.g., by using a known cache coherence scheme. The multi-cloud data storage system 100 may store a particular type of data in a database managed by a relational database management system, e.g., IBM DB2®, Oracle®, etc. In one embodiment, the multi-cloud data storage system 100 customizes sending and storing of data, e.g., by specifying one or more rules that determine processing of the data and a destination of the processed data and running the specified rules. In one embodiment, the multi-cloud data storage system 100 stores metadata representing a data storage location, e.g., an IP address of a particular cloud data storage system. A user can define a structure, e.g., a tree, etc., of cloud data storage systems in the defined rule(s). The user may define a plurality of rules. The multi-cloud data storage system 100 or the user selects one or more defined rules among the plurality of rules based on the user's need and/or resources needed to process the user's request. The multi-cloud data storage system 100 applies the selected rule(s) over the input data in order to process (e.g., whether to split the input data and/or whether to encrypt the input data and/or whether to encrypt the split input data, etc.) data according to the selected rules. The multi-cloud data storage system 100 stores the processed data in a particular priority queue and/or a particular cloud data storage system according to the selected rules. In one embodiment, the multi-cloud data storage system 100 dynamically manages in real-time the cloud data storage systems, e.g., by dynamically updating the defined (or selected) rules and by applying the dynamically updated rules when processing and storing of the input data.

In one embodiment, a computing system may run the method illustrated in FIG. 3. The computing system may implement and/or run the cloud volume management 130, the input scheduler 205 and the output scheduler 210. FIG. 15 illustrates examples of the computing system. Examples of the computing system may include, but are not limited to: a parallel computing system 1500 including at least one processor 1555 and at least one memory device 1570, a mainframe computer 1505 including at least one processor 1556 and at least one memory device 1571, a desktop computer 1510 including at least one processor 1557 and at least one memory device 1572, a workstation 1515 including at least one processor 1558 and at least one memory device 1573, a tablet computer 1520 including at least one processor 1556 and at least one memory device 1574, a netbook computer 1525 including at least one processor 1560 and at least one memory device 1575, a smartphone 1530 including at least one processor 1561 and at least one memory device 1576, a laptop computer 1535 including at least one processor 1562 and at least one memory device 1577, a physical server 1540 including at least one processor 1561 and at least one memory device 1578, or a software server 1580, e.g., web server, HTTP server, application server, etc.

In one embodiment, the methods shown in FIG. 3 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the methods shown in FIGS. 1 and 3-4 may be implemented on a semiconductor chip, e.g., ASIC (Application-Specific Integrated Circuit), by using a semi custom design methodology, i.e., designing a semiconductor chip using standard cells and a hardware description language.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by a device that runs an instruction. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may run the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which run on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for managing heterogeneous cloud data storage systems, the system comprising:
   at least one memory device;
   at least one processor connected to the memory device, wherein the processor is configured to:
      define rules that govern a plurality of heterogeneous cloud data storage systems;
      receive first-type data and second-type data from one or more user computers;
      determine a respective priority for each of the first-type data and the second-type data, the priority of the first-type data is different than the priority of the second-type data;
      send the first-type data to a first queue for storage thereat and the second-type data to a second queue for storage thereat according to the determined priority; and
      send the first-type data and the second-type data from the first or second queue according to the defined rules for storage into the plurality of heterogeneous cloud data storage systems,
      wherein one of the first and second queues takes a longer data processing time to store and send than the other of the first and second queues.

2. The system according to claim 1, wherein in order to define rules, the processor is configured to:
   specify that each cloud data storage system stores a different type of data.

3. The system according to claim 1, wherein in order to define rules, the processor is configured to:
   split at least one of the first-type data and the second-type data; and
   store the split data at a cloud storage system whose resource usage to store the split data is lowest among the plurality of heterogeneous cloud data storage systems.

4. The system according to claim 1, wherein the processor is further configured to:
   split at least one of the first-type data and the second-type data; and
   encrypt the split data before storing the split data at the plurality of heterogeneous cloud data storage systems.

5. The system according to claim 1, wherein the processor is further configured to:
   split at least one of the first-type data and the second-type data; and
   send the split data to each different cloud data storage system according to the defined rules.

6. The system according to claim 1, wherein the first queue takes a longer data processing time than the second queue whose priority is lower than the first queue.

7. The system according to claim 1, wherein the first queue takes a less data processing time than the second queue whose priority is lower than the first queue.

8. The system according to claim 1, further comprising:
   an input scheduler by which the receiving of first-type data and second-type from one or more user computers, the determining of a respective priority for each of the first-type data and the second type data, and sending of the first-type data to a first queue for storage thereat and the second-type data to a second queue for storage thereat according to the determined priority are performed; and
   an output scheduler including the first and second queues, and an output processing unit,
   wherein the output processing unit is configured to provide feedback data corresponding to status of each cloud data storage system to the at least one processor.

9. The system according to claim 1, further comprising:
   an output scheduler including the first and second queues, and an output processing unit,
   wherein the output processing unit is configured to apply a corresponding security rule on the first-type data and the second-type data according to the determined priority of each of the first-type data and the second-type data.

10. The system according to claim 8, wherein the feedback data is used to update the defined rules in real-time based on the feedback data to at least one of the cloud data storage systems.

11. The system according to claim 10, wherein the updating of the defined rules includes changing a data type that can be stored in the at least one of the cloud data storage system.

12. A computer program product for managing heterogeneous cloud data storage systems, the computer program product comprising a computer readable storage medium, the computer readable storage medium excluding a propagating signal, the computer readable storage medium readable by a processing circuit and storing instructions run by the processing circuit for performing a method, said method steps comprising:
   defining rules that govern a plurality of heterogeneous cloud data storage systems;
   receiving first-type data and second-type data from one or more user computers;
   determining a respective priority for each of the first-type data and the second-type data, the priority of the first-type data is different than the priority of the second-type data;
   sending the first-type data to a first queue for storage thereat and the second-type data to a second queue for storage thereat according to the determined priority; and
   sending the first-type data and the second-type data from the first or second queue according to the defined rules for storage into the plurality of heterogeneous cloud data storage systems,
   wherein one of the first and second queues takes a longer data processing time to send and store than the other of the first and second queues.

13. The computer program product according to claim 12, wherein the method steps further comprise:
   splitting at least one of the first-type data and the second-type data; and
   sending the split data to each different cloud data storage system according to the defined rules.

14. The computer program product according to claim 12, wherein the defining rules include:
  specifying that each cloud data storage system stores a different type of data.

15. The computer program product according to claim 12, wherein the method steps further comprise:
  splitting at least one of the first-type data and the second-type data, and
  wherein the defining rules include:
  storing the split data at a cloud storage system whose resource usage to store the split data is lowest among the plurality of heterogeneous cloud data storage systems.

16. The computer program product according to claim 12, wherein the method steps further comprise:
  splitting at least one of the first-type data and the second-type data; and
  encrypting the split data before storing the split data at the plurality of heterogeneous cloud data storage systems.

17. The computer program product according to claim 12, wherein the first queue takes a data longer processing time than the second queue whose priority is lower than the first queue.

18. The computer program product according to claim 12, wherein the first queue takes a data less processing time than the second queue whose priority is lower than the first queue.

* * * * *